(12) United States Patent
Masuda (10) Patent No.: US 10,055,443 B2
(45) Date of Patent: Aug. 21, 2018

(54) INFORMATION PROCESSING METHOD, STORAGE MEDIUM, AND INFORMATION PROCESSING APPARATUS

(71) Applicant: CANON KABUSHIKI KAISHA, Tokyo (JP)

(72) Inventor: Mitsuhiro Masuda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 457 days.

(21) Appl. No.: 14/796,028

(22) Filed: Jul. 10, 2015

(65) Prior Publication Data

US 2016/0012095 A1 Jan. 14, 2016

(30) Foreign Application Priority Data

Jul. 11, 2014 (JP) ................................. 2014-143660
Jun. 26, 2015 (JP) ................................. 2015-128958

(51) Int. Cl.
*G06F 17/30* (2006.01)
*H04L 29/08* (2006.01)

(52) U.S. Cl.
CPC ........ *G06F 17/30368* (2013.01); *H04L 67/12* (2013.01); *H04L 67/22* (2013.01); *H04L 67/2842* (2013.01)

(58) Field of Classification Search
USPC ................................................. 707/609, 648
See application file for complete search history.

(56) References Cited

U.S. PATENT DOCUMENTS

| 6,757,726 | B2 | 6/2004 | Matsumoto et al. |
| 7,870,093 | B2 * | 1/2011 | Eguchi ................ G06F 11/1471 |
| | | | 707/609 |
| 8,078,574 | B1 * | 12/2011 | Malmskog ........ G06F 17/30902 |
| | | | 707/609 |
| 8,316,100 | B2 * | 11/2012 | Essenmacher ....... G06Q 10/107 |
| | | | 707/609 |

(Continued)

FOREIGN PATENT DOCUMENTS

JP 2002251313 A 9/2002

*Primary Examiner* — Kim Nguyen
(74) *Attorney, Agent, or Firm* — Rossi, Kimms & McDowell LLP (57) ABSTRACT

The present invention provides an information processing method of processing history information of a manufacturing apparatus with an information processing apparatus including a storage, the method comprising a first transferring step of transferring, based on a request from a first information processing apparatus, history information stored in the storage to the first information processing apparatus, an updating step of updating the history information stored in the storage, and a second transferring step of transferring, based on a request from a second information processing apparatus, history information stored in the storage to the second information processing apparatus, wherein the second transferring step transfers, in a case where history information requested by the second information processing apparatus has not been obtained from the manufacturing apparatus, the history information to the second information processing apparatus after the history information is obtained.

12 Claims, 6 Drawing Sheets

(56) References Cited

U.S. PATENT DOCUMENTS

| | | | |
|---|---|---|---|
| 8,607,138 B2* | 12/2013 | Harold | G06F 17/30592 |
| | | | 707/609 |
| 8,913,337 B2* | 12/2014 | Katagiri | G11B 15/20 |
| | | | 360/50 |
| 9,740,481 B2* | 8/2017 | Hoikka | G06F 9/00 |
| 9,858,963 B2* | 1/2018 | Sekido | G11B 20/1217 |
| 2015/0242326 A1* | 8/2015 | Jayaprakash | G06F 12/0862 |
| | | | 711/137 |
| 2015/0363289 A1* | 12/2015 | Brough | H04W 24/10 |
| | | | 709/224 |

* cited by examiner

| LOG FILES IN MANUFACTURING APPARATUS | | STATUS OF OBTAINING BY UPDATE UNIT |
|---|---|---|
| LOG FILE NAMES | GENERATION DATE-TIME OF LOG FILES | |
| L0001 | 2014/1/1 0:00 | DELETED |
| L0002 | 2014/1/1 1:00 | OBTAINED |
| L0003 | 2014/1/1 2:00 | OBTAINED |
| L0004 | 2014/1/1 3:00 | OBTAINED |
| L0005 | 2014/1/1 4:00 | OBTAINED |
| L0006 | 2014/1/1 5:00 | NOT OBTAINED |
| L0007 | 2014/1/1 6:00 | NOT OBTAINED |
| L0008 | 2014/1/1 7:00 | NOT OBTAINED |
| L0009 | 2014/1/1 8:00 | NOT OBTAINED |
| L0010 | 2014/1/1 9:00 | NOT OBTAINED |

INFORMATION PROCESSING METHOD, STORAGE MEDIUM, AND INFORMATION PROCESSING APPARATUS

BACKGROUND OF THE INVENTION

Field of the Invention

The present invention relates to an information processing method of processing history information of a manufacturing apparatus, a storage medium, and an information processing apparatus.

Description of the Related Art

Log data (history information) of a manufacturing apparatus for manufacturing semiconductor devices and so on may be obtained by a plurality of external terminals via an external network such as the Internet. In the case where log data transfer is requested at the same time by the plurality of external terminals, a method for transferring such log data from the manufacturing apparatus directly to each of the plurality of external terminals may result in an increased processing load in the manufacturing apparatus. Japanese Patent Laid-Open No. 2002-251313 discloses a cache server including storing means for storing information of data held by each of a plurality of cache servers. The cache server includes information managing means for searching, in response to a data inquiry request from another cache server, the above storing means for a cache server that stores the data related to the request. The information managing means notifies the other cache server of the result of the search.

The log data of the manufacturing apparatus may be transferred to a client via a (cache) server for storing the log data. However, because the amount of log data of the manufacturing apparatus has greatly increased in recent years, it is accordingly necessary to increase the capacity of the data storage of the server.

SUMMARY OF THE INVENTION

The present invention provides, for example, a technique advantageous in processing of a large amount of history information.

According to one aspect of the present invention, there is provided an information processing method of processing history information of a manufacturing apparatus with an information processing apparatus including a storage, the method comprising: a first transferring step of transferring, based on a request from a first information processing apparatus, history information stored in the storage in time series to the first information processing apparatus; an updating step of updating the history information stored in the storage by deleting from the storage the history information transferred to the first information processing apparatus in the first transferring step and obtaining history information from the manufacturing apparatus in time series; and a second transferring step of transferring, based on a request from a second information processing apparatus, history information stored in the storage to the second information processing apparatus, wherein the second transferring step transfers, in a case where history information requested by the second information processing apparatus has not been obtained from the manufacturing apparatus, the history information requested by the second information processing apparatus to the second information processing apparatus after the history information requested by the second information processing apparatus is obtained in the updating step.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings. Note that the same reference numerals denote the same members throughout the drawings, and a repetitive description thereof will not be given.

First Embodiment

Figure 1:
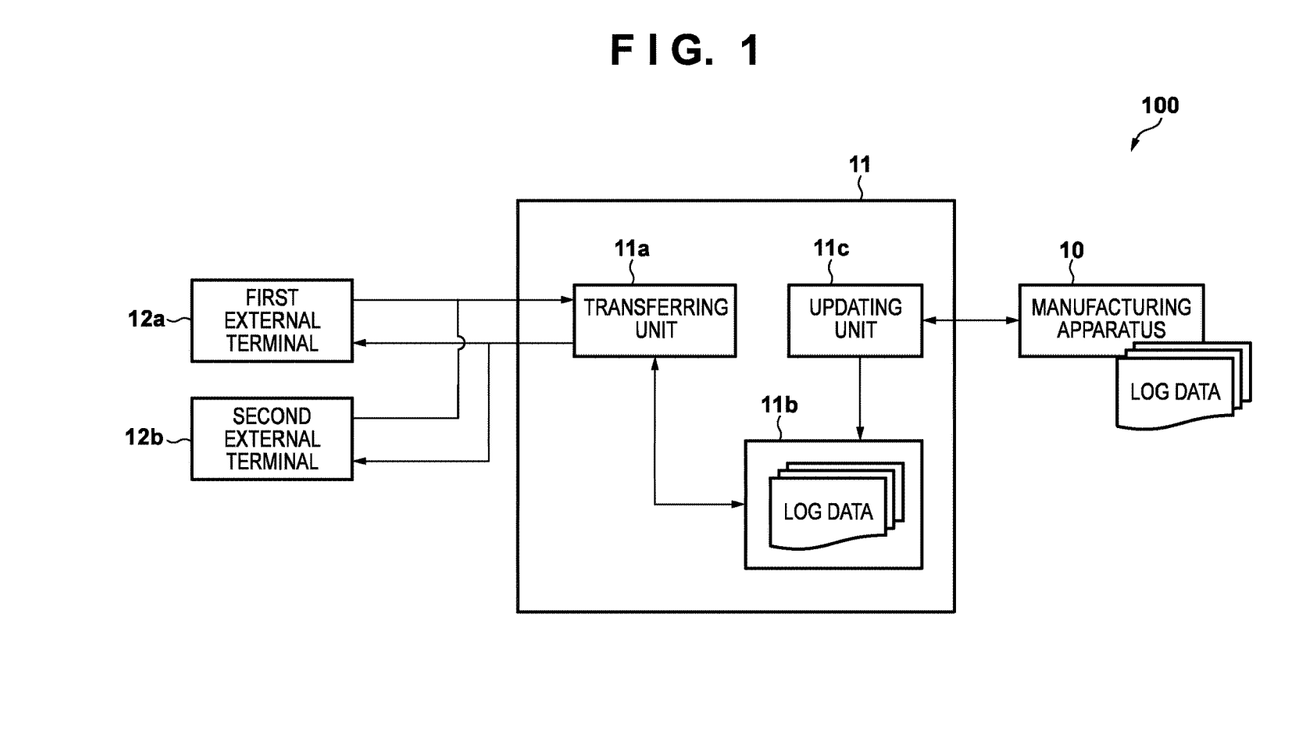
FIG. 1 is a diagram showing a transfer system according to a first embodiment.

A transfer system (transferring system) 100 of a first embodiment of the present invention will be described with reference to FIG. 1. The transferring system 100 of the first embodiment may include a manufacturing apparatus 10 for manufacturing an article (eg. a semiconductor device), a plurality of external terminals 12 (client apparatuses), and a cache server 11 (a server apparatus). The cache server 11 is constituted by, for example, an information processing apparatus, and transfers log data (history information) generated by the manufacturing apparatus 10 to each of the plurality of external terminals 12. Note that the cache server and at least one of the plurality of external terminals can be comprised or included in a single information processing apparatus (single server machine or computer) as, for example, virtual machines by, for example, operating a plurality of OS's on a virtualization software in the single information processing apparatus. Here, the manufacturing apparatus 10 may be, for example, a lithography apparatus (such as an exposure apparatus, a drawing apparatus, an imprint apparatus and so on), a deposition apparatus (a plasma deposition apparatus), an etching apparatus, an annealing apparatus, an ion injection apparatus, a cleaning apparatus, a developing apparatus and so on. The log data (history information) is information representing the operation history of the manufacturing apparatus 10, and may contain information regarding the operation of the manufacturing apparatus 10 such as the temperature change of the respective components of the manufacturing apparatus 10 and so on during the operation of the manufacturing apparatus 10. Moreover, each of the plurality of external terminals 12 is constituted by, for example, an information processing apparatus, and may include, for example, a first external terminal 12a (first information processing apparatus) and a second external terminal 12b (second information processing apparatus). The first external terminal 12a makes transfer requests for the log data to the cache server 11 in time series. The second external terminal 12b randomly makes transfer requests for the log data to the cache server 11.

The cache server 11 stores in time series a portion of the plurality of pieces of the log data generated in the manufacturing apparatus 10, and transfers the plurality of pieces of stored log data to each of the plurality of external terminals 12. The cache server 11 may include, for example, a transferring unit 11a, a storage 11b, and an updating unit 11c. The transferring unit 11a transfers log data for which a transfer request was received from an external terminal 12 to the external terminal 12. The storage 11b stores in time series a portion of the plurality of pieces of the log data generated in the manufacturing apparatus 10. The updating unit 11c deletes from the storage 11b the log data transferred to the first external terminal 12a and obtains in time series the log data from the manufacturing apparatus 10, thereby updating the plurality of pieces of the log data stored in the storage 11b.

The cache server 11 of the first embodiment stores in the storage 11b a portion of the plurality of pieces of the log data generated in the manufacturing apparatus 10, and updates, in response to a transfer request from the first external terminal 12a, the plurality of pieces of the log data stored in the storage 11b using the updating unit 11c. Thus, in the cache server 11 of the first embodiment, the storage 11b does not need to have a capacity for storing all of the plurality of pieces of the log data generated in the manufacturing apparatus 10. On the other hand, it may be the case that, for example, the log data for which a transfer request was received from the second external terminal 12b has not yet been obtained from the manufacturing apparatus 10 and is not stored in the storage 11b. In this case, the cache server 11 of the first embodiment waits for the log data for which the transfer request was received from the second external terminal 12b to be obtained from the manufacturing apparatus 10 and then transfers the log data to the second external terminal 12b. That is, in the case where the log data requested by the second external terminal 12b has not been obtained from the manufacturing apparatus 10, the cache server 11 transfers the log data to the second external terminal 12b after the log data is obtained by the updating unit 11c.

Figure 2:
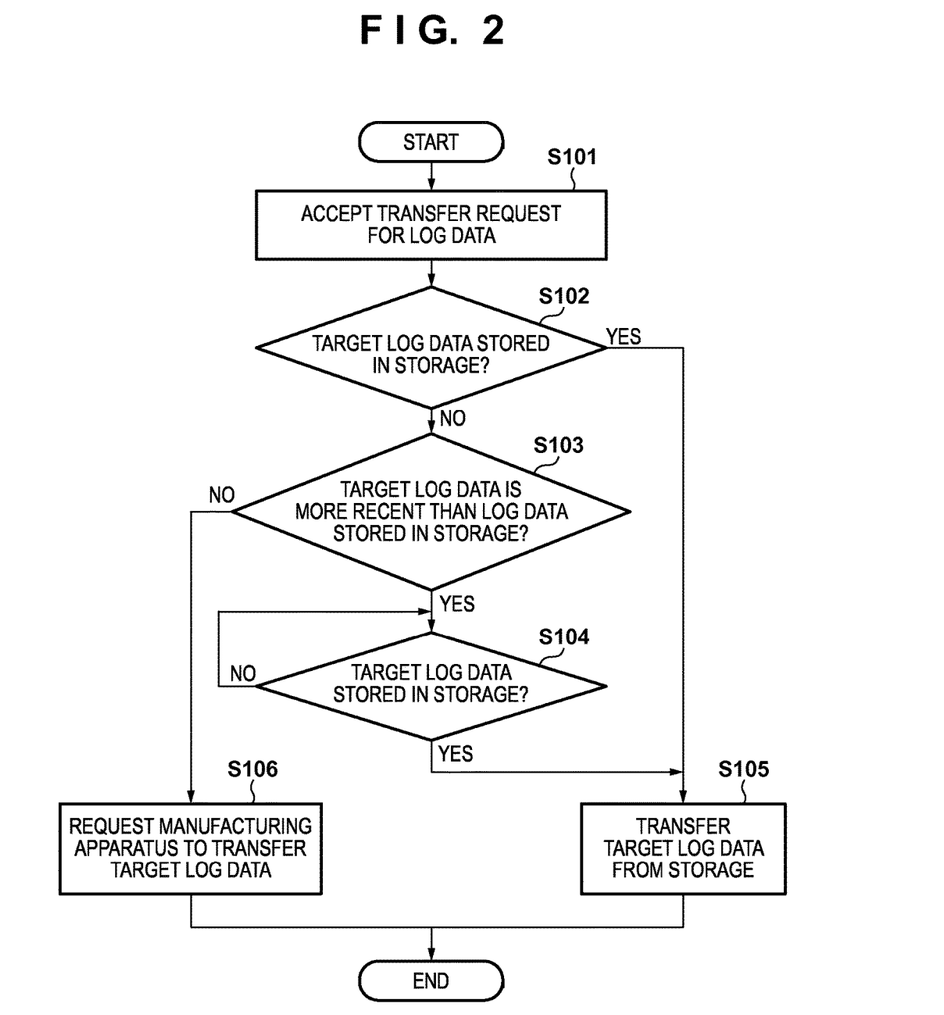
FIG. 2 is a flowchart showing a step of transferring log data.

Next, the log data transfer in the cache server 11 of the first embodiment to the second external terminal 12b will be described with reference to FIG. 2. FIG. 2 is a flowchart showing a log data transferring step in the cache server 11 to the second external terminal 12b. In S101, the cache server 11 accepts a transfer request for the log data from the second external terminal 12b. In S102, the cache server 11 determines whether or not the log data for which the transfer request was received from the second external terminal 12b (target log data) is stored in the storage 11b. In the case where the target log data is not stored in the storage 11b, the operation moves onto S103, and in the case where the target log data is stored in the storage 11b, the operation moves onto S105. In S103, the cache server 11 determines whether or not the point in time at which the target log data was generated in the manufacturing apparatus 10 (hereinafter referred to as "time point") is more recent than the log data stored in the storage 11b. In the case where the time point of the target log data is more recent than the log data stored in the storage 11b, the operation moves onto S104. In S104, the cache server 11 determines whether or not the target log data has been obtained from the manufacturing apparatus 10 by the updating unit 11c and stored in the storage 11b. The cache server 11 withholds transferring the target log data to the second external terminal 12b until the target log data is stored in the storage 11b. In S105, the cache server 11 transfers the target log data stored in the storage 11b to the second external terminal 12b.

Figure 3A:
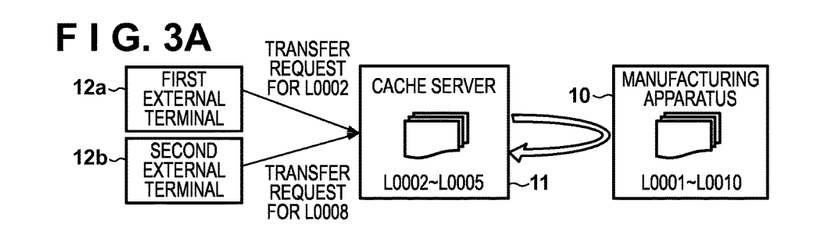
FIG. 3A is a diagram for illustrating a transferring step of log data.
Figure 3B:
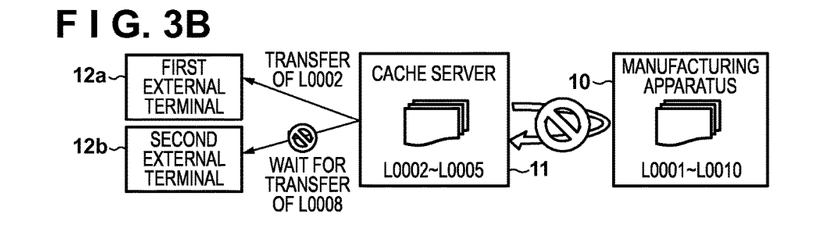
FIG. 3B is a diagram for illustrating a transferring step of log data.
Figure 3C:
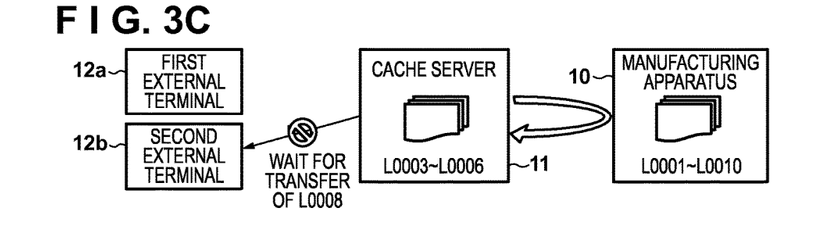
FIG. 3C is a diagram for illustrating a transferring step of log data.
Figure 3D:
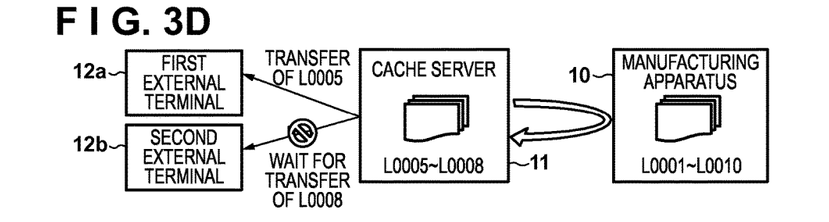
FIG. 3D is a diagram for illustrating a transferring step of log data.
Figure 3E:
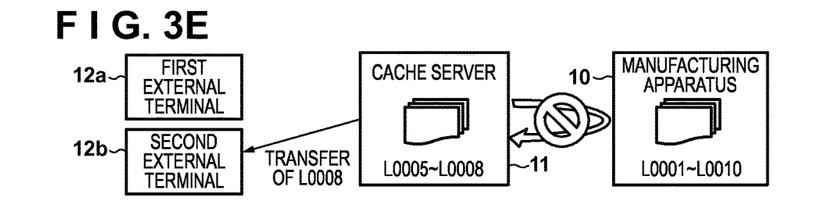
FIG. 3E is a diagram for illustrating a transferring step of log data.
Figure 4:
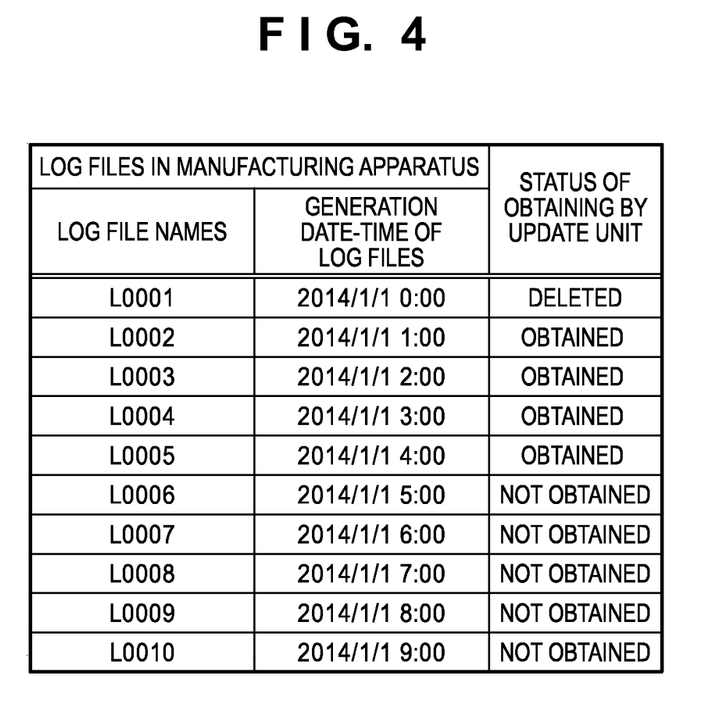
FIG. 4 is a diagram showing a status of each piece of log data generated by a manufacturing apparatus.

Here, steps S103 to S105 in FIG. 2 will be described in detail with reference to FIGS. 3A to 3E. FIGS. 3A to 3E are diagrams for illustrating the log data transferring steps in the cache server 11 to the second external terminal 12b. In examples shown in FIGS. 3A to 3E, the numbers assigned to the log data indicate the order in which the respective pieces of the log data were generated in the manufacturing apparatus 10. That is, log data with a smaller number was generated at an earlier time point by the manufacturing apparatus 10. For example, a case is assumed where ten pieces of log data (stream data or data files L0001 to L0010) are generated by the manufacturing apparatus 10 and the storage 11b of the cache server 11 can store four pieces of log data. The number of the pieces of log data may be the added number of data groups of some type, such as log files. It is also assumed that four pieces of the log data (L0002 to L0005) are stored in the storage 11b of the cache server 11, and that the log data L0001 has been already deleted from the storage 11b, as shown in FIG. 4. FIG. 4 is a diagram showing a status of each piece of the log data generated by the manufacturing apparatus 10. It is also assumed that the first external terminal 12a made a transfer request for the log data L0002 to the cache server 11 and the second external terminal 12b made a transfer request of the log data L0008 to the cache server 11, as shown in FIG. 3A. In this case, because the pieces of log data stored in the storage 11b are L0002 to L0005 as shown in FIG. 3B, the cache server 11 transfers the log data L0002 to the first external terminal 12a, but does not transfer the log data L0008 to the second external terminal 12b.

The cache server 11 transfers the log data L0002 to the first external terminal 12a. The cache server 11 then deletes, from the plurality of pieces of the log data stored in the storage 11b, the piece of log data that has been transferred to the first external terminal 12a and has the oldest time point of generation by the manufacturing apparatus 10, that is, the log data (L0002) that was generated earliest by the manufacturing apparatus 10. The cache server 11 then obtains, from the manufacturing apparatus 10, the log data (L0006) that was generated by the manufacturing apparatus 10 following the generation of the log data (L0005) that is stored in the storage 11b and has the latest time point of generation by the manufacturing apparatus 10. At this time, the log data may be updated (by deleting or obtaining log data) such that the number of the pieces of the log data stored in the storage 11b does not change. The status of the transferring system 100 during this time is as shown in FIG. 3C. Here, deleting log data means erasing the log data from the storage 11b or overwriting the log data with another piece of log data.

The first external terminal 12a makes transfer requests for log data to the cache server 11 in time series. The first external terminal 12a then makes a transfer request for log data L0004 to the cache server 11, and after the log data L0004 is transferred to the first external terminal 12a, the cache server 11 obtains the log data L0008 from the manufacturing apparatus 10, as shown in FIG. 3D. Accordingly, the log data L0008 is stored in the storage 11b, and the cache server 11, as shown in FIG. 3E, transfers the log data L0008 to the second external terminal 12b. In this way, the cache server 11 waits for the log data for which a transfer request was received from the second external terminal 12b to be obtained and then transfers the log data to the second external terminal 12b.

On the other hand, in S103, in the case where the time point of the target log data is earlier than the log data stored in the storage 11b, the operation moves onto S106. The time point of the target log data will be earlier than the log data stored in the storage 11b in the case where the target log data has already been transferred to the first external terminal 12a and deleted from the storage 11b. In this case, the cache server 11 does not carry out the operation of obtaining the target log data from the manufacturing apparatus 10 and storing the target log data in the storage 11b. In S106, the cache server 11 thus makes a request to the manufacturing apparatus 10 for the target log data to be transferred to the second external terminal 12b from the manufacturing apparatus 10. The target log data is thereby transferred directly from the manufacturing apparatus 10 to the second external terminal 12b without going through the cache server 11. Accordingly, the second external terminal 12b can obtain the target log data, even in the case where the target log data has been deleted from the storage 11b.

As stated above, the cache server 11 of the first embodiment updates, in response to a transfer request from the first external terminal 12a, the plurality of pieces of the log data stored in the storage 11b by the updating unit 11c. Then, in the case where the log data for which the transfer request was received from the second external terminal 12b has not been obtained from the manufacturing apparatus 10 yet and not stored in the storage 11b, the cache server 11 waits for the log data to be obtained from the manufacturing apparatus 10 and then transfers the log data to the second external terminal 12b. By configuring the cache server 11 in this way, the storage 11b does not need to have the capacity to store all of the plurality of pieces of the log data generated by the manufacturing apparatus 10, advantageously reducing the cost of the cache server 11.

Figure 5:
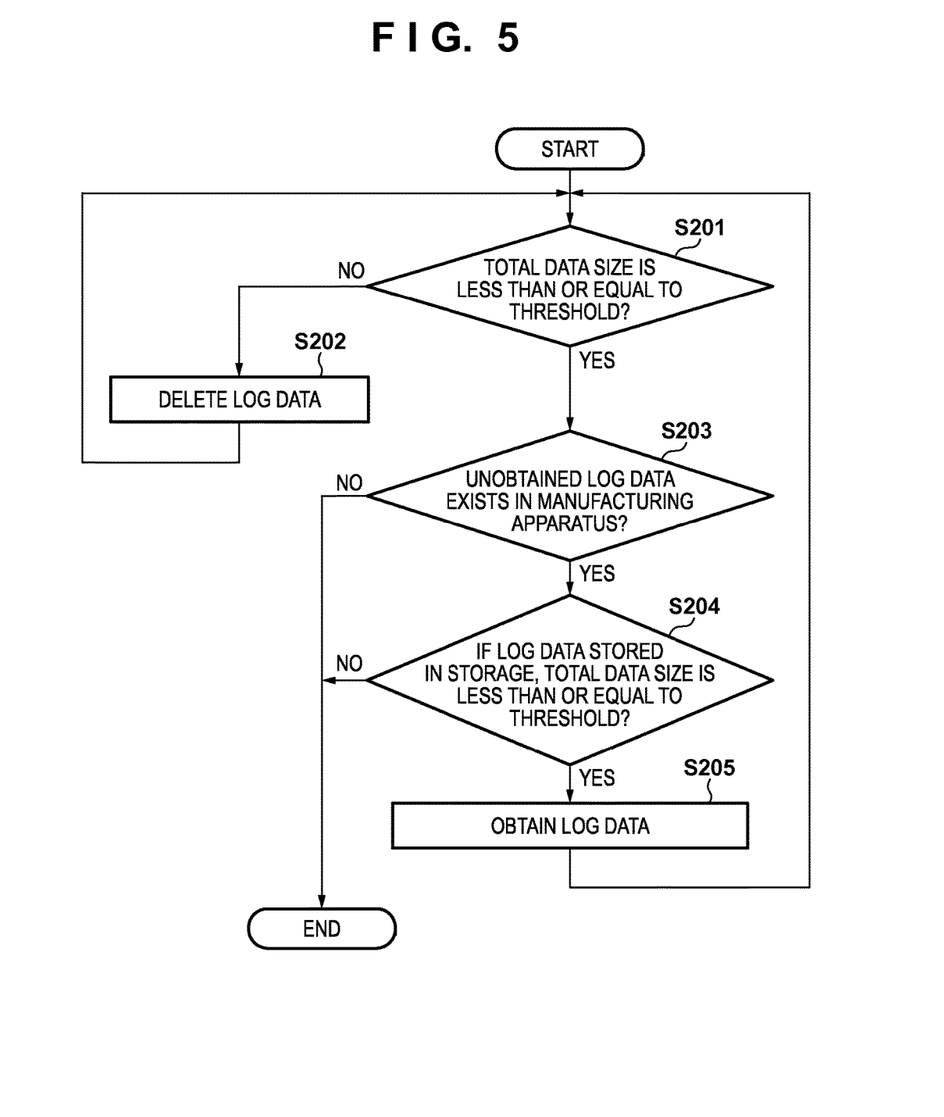
FIG. 5 is a flowchart showing obtaining and deleting steps of log data.

Here, the plurality of pieces of the log data generated by the manufacturing apparatus 10 do not necessarily have the same data size as each other. The cache server 11 thus may obtain and delete log data stored in the storage 11b such that the maximum number of pieces of log data for which the total data size of the log data is less than or equal to a threshold is stored in the storage 11b. For example, log data may be obtained and deleted in accordance with a flowchart shown in FIG. 5. In S201, the cache server 11 determines whether or not the total data size of the log data stored in the storage 11c is less than or equal to a threshold. In the case where it is determined that the total data size is not less than or equal to the threshold, the operation moves onto S202. In S202, the cache server 11 deletes, from the plurality of pieces of the log data stored in the storage 11b, the piece of the log data that has been transferred to the first external terminal 12a and has the oldest time point. On the other hand, in the case where it is determined in S201 that the total amount of the data size is less than or equal to the threshold, the operation moves onto S203. In S203, the cache server 11 determines whether or not log data that has not been obtained yet by the updating unit 11c is stored in the manufacturing apparatus 10. In the case where log data that has not been obtained yet is stored in the manufacturing apparatus 10, the operation moves onto S204, and in the case where such log data is not stored, the operation of obtaining log data is not performed. In S204, the cache server 11 specifies, among the pieces of log data that are stored in the manufacturing apparatus 10 and have not been obtained yet, the piece of log data that has the oldest time point of generation by the manufacturing apparatus 10. In the case where the specified log data is stored in the storage 11b, it is then determined whether or not the total data size of the log data stored in the storage 11c is less than or equal to the threshold. In the case where the total data size is less than or equal to the threshold, the operation moves onto S205, and in the case where the total data size is not less than or equal to the threshold, the operation of obtaining log data is not performed. In S205, the cache server 11 obtains the specified log data using the updating unit 11c.

Here, in some cases, the log data generated by the manufacturing apparatus 10 cannot be transferred without processing. For example, in some cases, log data generated by the manufacturing apparatus 10 may contain confidential information of the user of the log data, or the format of the same log data may be different from the available formats of the external terminals 12a and 12b. In such cases, the transferring unit 11a transfers the log data to the external terminals 12a and 12b after processing the log data. The processing may include at least one of deleting the confidential information, encoding the confidential information, and converting the data format.

Second Embodiment

Figure 6:
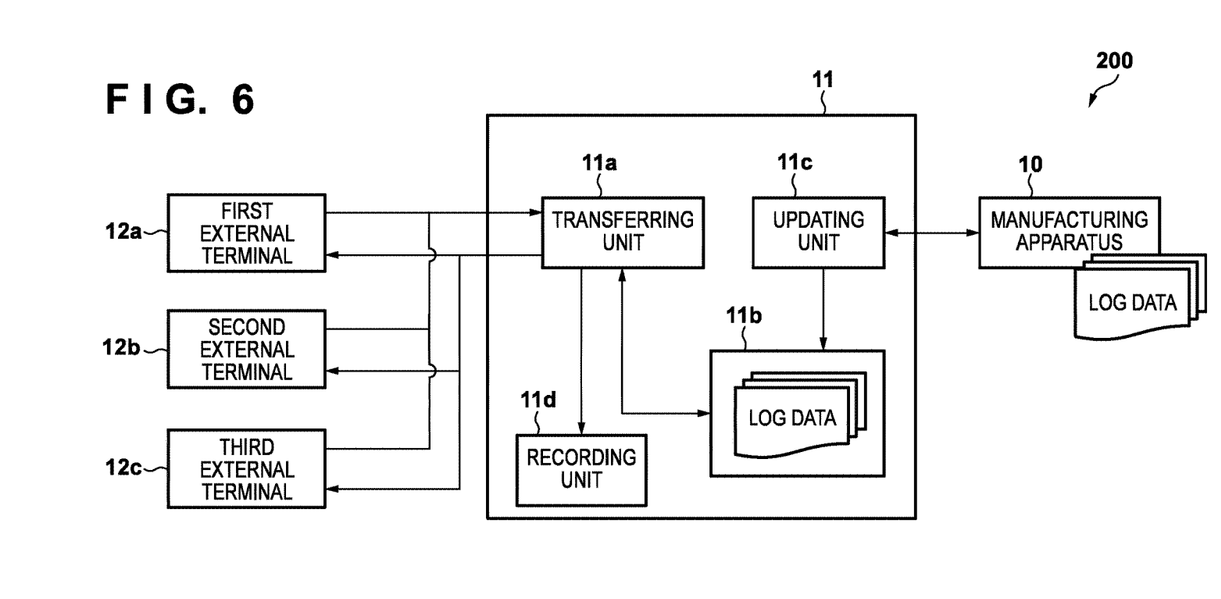
FIG. 6 is a diagram showing a transferring system according to a second embodiment.

A transfer system of a second embodiment 200 will be described with reference to FIG. 6. Regarding the transferring system 200 of the first embodiment, the case where the first external terminal 12a is the only external terminal 12 that makes transfer requests for log data to the cache server 11 in time series was described. However, in some cases, there are a plurality of external terminals 12 that make transfer requests for log data in time series in the transferring system. For example, the transferring system 200 shown in FIG. 6 has, in addition to the first external terminal 12a, a third external terminal 12c (third information processing apparatus) for making transfer requests for log data in time series. In this case, each of the plurality of pieces of log data stored in the storage 11b may be transferred to both the first external terminal 12a and the third external terminal 12c. The cache server 11 of the second embodiment thus includes a recording unit 11d for recording a type of the log data that was last transferred to the each of the external terminals 12 for making transfer requests for log data in time series.

Figure 7:
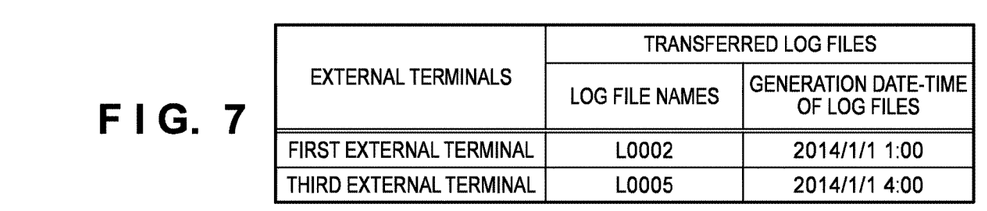
FIG. 7 is a diagram showing recording results by a recording unit.

FIG. 7 is a diagram showing recording results by the recording unit 11d. In the example shown in FIG. 7, the log data that was last transferred to the first external terminal 12a and the log data that was last transferred to the third external terminal 12c are stored. The cache server 11 then, based on the recording results by the recording unit 11d, deletes with the updating unit 11c only the log data transferred to all of the plurality of external terminals 12 for making transfer requests for log data in time series. That is, in the example shown in FIG. 7, the log data L0002 transferred to both the first external terminal 12a and the third external terminal 12c is deleted, and the log data L0003 to L0005 are not deleted. Accordingly, each of the plurality of pieces of the log data stored in the storage 11b can be deleted after being transferred to all of the plurality of external terminals 12 for making transfer requests for log data in time series.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-143660 filed on Jul. 11, 2014, and No. 2015-128958, filed Jun. 26, 2015, which are hereby incorporated by reference herein in their entirety.

What is claimed is:

1. An information processing method of processing history information generated in a manufacturing apparatus, by a server including a storage which is configured to store a part of the history information, the method comprising:
   a first transferring step of transferring, to a first client, a piece of history information requested by the first client among history information stored in the storage, wherein the first client is configured to sequentially request a piece of history information to the server in an generation order by the manufacturing apparatus;
   an updating step of updating history information stored in the storage by deleting the piece of history information transferred from the storage to the first client in the first transferring step, and sequentially obtaining a piece of the history information from the manufacturing apparatus in time series; and
   a second transferring step of transferring, to a second client, a piece of history information requested by the second client, wherein the second client is configured to randomly request a piece of history information to the server,
   wherein in the second transferring step, in a case where the piece of history information requested by the second client has not yet been obtained from the manufacturing apparatus and is not stored in the storage, the piece of history information requested by the second client is transferred from the server to the second client after waiting until the piece of history information requested by the second client is obtained from the manufacturing apparatus by the server in the updating step.

2. The information processing method according to claim 1, wherein the updating step updates history information stored in the storage such that number of pieces of history information stored in the storage does not change.

3. The information processing method according to claim 1, wherein the updating step updates history information stored in the storage such that a maximum number of pieces of history information, of which a total data size is not greater than a threshold, is stored in the storage.

4. The information processing method according to claim 1, wherein the updating step deletes a piece of history information generated by the manufacturing apparatus earliest among a plurality of pieces of history information stored in the storage.

5. The information processing method according to claim 1, wherein the updating step obtains a piece of history information generated by the manufacturing apparatus earliest among a plurality of pieces of history information that has not been obtained from the manufacturing apparatus.

6. The information processing method according to claim 1, wherein in the second transferring step, in a case where the piece of history information requested by the second client has already been deleted from the storage, the piece of history information requested by the second client is transferred directly from the manufacturing apparatus to the second client.

7. The information processing method according to claim 1, wherein at least one of the first transferring step and the second transferring step processes the history information stored in the storage and transfers the processed history information.

8. The information processing method according to claim 1, wherein the method processes history information of a lithography apparatus as the manufacturing apparatus.

9. A non-transitory computer-readable storage medium storing a program for causing a computer to execute each step of an information processing method of processing history information generated in a manufacturing apparatus, by a server including a storage which is configured to store a part of the history information, the method comprising:
   a first transferring step of transferring, to a first client, a piece of history information requested by the first client among history information stored in the storage, wherein the first client is configured to sequentially request a piece of history information to the server in an generation order by the manufacturing apparatus;
   an updating step of updating history information stored in the storage by deleting the piece of history information transferred from the storage to the first client in the first transferring step, and sequentially obtaining a piece of the history information from the manufacturing apparatus in time series; and
   a second transferring step of transferring, to a second client, a piece of history information requested by the second client, wherein the second client is configured to randomly request a piece of history information to the server,
   wherein in the second transferring step, in a case where the piece of history information requested by the second client has not yet been obtained from the manufacturing apparatus and is not stored in the storage, the piece of history information requested by the second client is transferred from the server to the second client after waiting until the piece of history information requested by the second client is obtained from the manufacturing apparatus by the server in the updating step.

10. An information processing apparatus which includes a storage configured to store a part of the history information, and processes history information generated by a manufacturing apparatus, the apparatus comprising:
- a memory; and
- one or more processors, connected to the memory, the processors being configured to cause the information processing apparatus to function as:
- a transferring unit configured to transfer, to a first client, a piece of history information requested by the first client among history information stored in the storage, wherein the first client is configured to sequentially request a piece of history information to the server in an generation order by the manufacturing apparatus; and
- an updating unit configured to update history information stored in the storage by deleting the piece of history information transferred from the storage to the first client by the transferring unit, and sequentially obtaining a piece of the history information from the manufacturing apparatus in time series, wherein the transferring unit is configured to transfer, to a second client which is configured to randomly request a piece of history information to the server, a piece of history information requested by the second client, and to transfer, in a case where the piece of history information requested by the second client has not yet been obtained from the manufacturing apparatus and is not stored in the storage, the piece of history information requested by the second client to the second client after waiting until the piece of history information requested by the second client is obtained from the manufacturing apparatus.

11. The information processing method according to claim 6, further comprising a determining step of determining whether the piece of history information requested by the second client has already been deleted from the storage.

12. The information processing method according to claim 11, wherein the determining step is performed based on whether a generation time by the manufacturing apparatus for the piece of history information requested by the second client is more recent than history information stored in the storage.

* * * * *